(12) United States Patent
Khosrowpour et al.

(10) Patent No.: US 10,324,752 B2
(45) Date of Patent: Jun. 18, 2019

(54) RESPONSE TIMES BASED ON APPLICATION STATES

(71) Applicant: Dell Products, L.P., Round Rock, TX (US)

(72) Inventors: Farzad Khosrowpour, Pflugerville, TX (US); Mitchell Anthony Markow, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 60 days.

(21) Appl. No.: 15/608,260

(22) Filed: May 30, 2017

(65) Prior Publication Data

US 2018/0349173 A1  Dec. 6, 2018

(51) Int. Cl.
*G06F 9/46* (2006.01)
*G06F 9/48* (2006.01)
*G06F 9/50* (2006.01)

(52) U.S. Cl.
CPC .......... *G06F 9/4831* (2013.01); *G06F 9/4881* (2013.01); *G06F 9/5005* (2013.01); *G06F 9/5038* (2013.01); *G06F 9/46* (2013.01)

(58) Field of Classification Search
CPC .................................................. G06F 9/4831
See application file for complete search history.

(56) References Cited

U.S. PATENT DOCUMENTS

2005/0066019 A1* 3/2005 Egan .................. G06F 8/65
709/223
2012/0218309 A1* 8/2012 Zhang .................. G06F 9/451
345/661

* cited by examiner

*Primary Examiner* — Emerson C Puente
*Assistant Examiner* — Steven M Do
(74) *Attorney, Agent, or Firm* — Fogarty LLP

(57) ABSTRACT

Systems and methods for improving response times in based on application states. In some embodiments, an Information Handling System (IHS) may include a Central Processing Unit (CPU) and a hardware memory storage device coupled to the CPU, the hardware memory storage device having program instructions stored thereon that, upon execution by the CPU, configure the IHS to: identify a first state of an application being executed by the CPU at runtime; identify a trigger event configured to cause the IHS to change from the first state to a second state; in response to the trigger event, switch from the first state to a second state, wherein the first state is associated with first hardware configuration and the second state is associated with a second hardware configuration; and in response to the trigger event, switch the first hardware configuration to the second hardware configuration.

17 Claims, 6 Drawing Sheets

| APP STATES | POOR | ACCEPTABLE | GREAT | PLATFORM BOTTLENECK | OPTIMIZATION METHOD |
|---|---|---|---|---|---|
| TRIGGER | | | | | |
| INITIALIZE | | | | | |
| LAUNCH | | | | | |
| RESIZE | | | | | |
| LOAD | | | | | |
| CLOSE | | | | | |
| ROTATE | | | | | |
| VIEW | | | | | |
| EXIT | | | | | |
| RESUME | | | | | |
| SWITCH | | | | | |
| AUTO SAVE | | | | | |
| REFRESH | | | | | |
| RUN | | | | | |

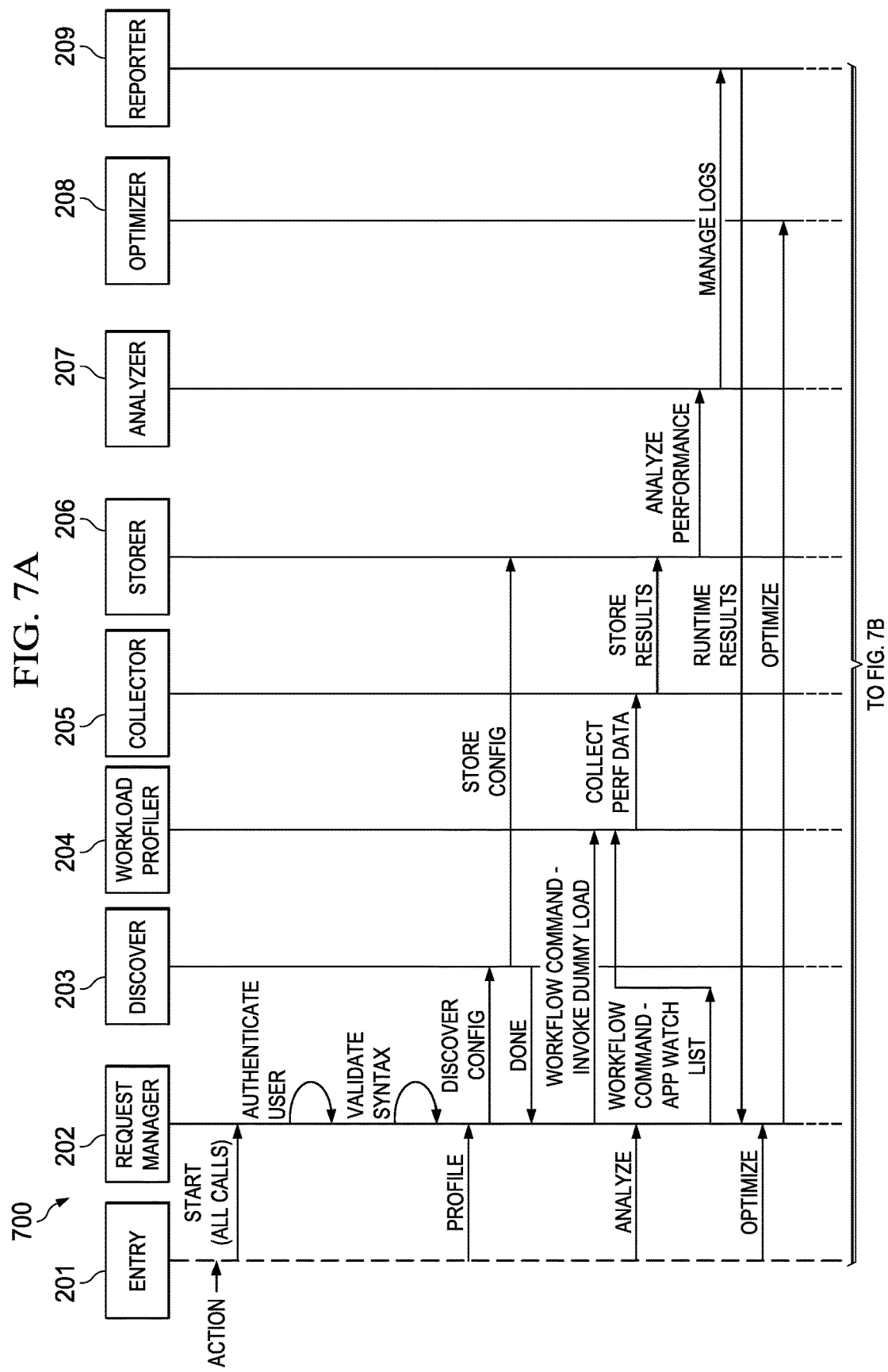

RESPONSE TIMES BASED ON APPLICATION STATES

FIELD

The present disclosure generally relates to Information Handling Systems (IHSs), and, more particularly, to systems and methods for improving response times based on application states.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes.

Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use, such as financial transaction processing, airline reservations, enterprise data storage, global communications, etc.

In addition, IHSs may include a variety of hardware and software components that may be configured to process, store, and communicate information; and may include one or more computer systems, data storage systems, and/or networking systems.

IHS form factors are shrinking and producing significant challenges. As an example, consider that, although battery capacity has increased at the rate of 10% per year, the density and weight of these batteries still make them impractical for use in small IHSs.

Yet, the inventors hereof have recognized that users expect certain response times from applications and platforms. Conventional modifications to an IHS's voltage, frequency, and/or power policies alone are insufficient to provide fast response times, particularly in small-form factor IHSs, due to complex interactions among power, thermal, and battery capacity budgets, and application demands. To address these, and other concerns, the inventors have developed systems and methods for improving response times based on application states.

SUMMARY

Embodiments of systems and methods for improving response times based on application states are described. In an illustrative, non-limiting embodiment, an Information Handling System (IHS) may comprise a Central Processing Unit (CPU) and a hardware memory storage device coupled to the CPU, the hardware memory storage device having program instructions stored thereon that, upon execution by the CPU, configure the IHS to: identify a first state of an application being executed by the CPU at runtime; identify a trigger event configured to cause the IHS to change from the first state to a second state; in response to the trigger event, switch from the first state to a second state, wherein the first state is associated with first hardware configuration and the second state is associated with a second hardware configuration; and in response to the trigger event, switch the first hardware configuration to the second hardware configuration.

In some cases, at least one of the trigger events may be selected from the group consisting of: initialize, launch, resize, load, close, rotate, view, exit, resume, switch, auto save, refresh, and run. The first and second states may be selected from the group consisting of: initializing, launching, resizing, loading, closing, rotating, viewing, exiting, resuming, switching, saving, refreshing, and running. The trigger event may belong to a profile that stores, for the trigger event, an identification of a bottleneck and the second hardware configuration. The bottleneck may include a CPU bottleneck, and the second hardware configuration may include a number of CPU cores or speed that enables the IHS to respond to a user command received during the second state within the second response time.

The bottleneck may include a memory or storage bottleneck, and the second hardware configuration may include a memory allocation or bandwidth that enables the IHS to respond to a user command received during the second state within the second response time. Additionally or alternatively, the bottleneck may include a network or communication bottleneck, and the second hardware configuration may include a network priority or bandwidth that enables the IHS to respond to a user command received during the second state within the second response time.

The profile may further store a second response time obtainable with the second hardware configuration, a first response time stored in the profile in association with the first state may be shorter that the second response time when the application is in the first state, and wherein the second response time may be shorter than the first response time when the application is in the second state.

In some cases, the program instructions, upon execution, may further configure the IHS to, prior to the switch from the first hardware configuration to the second hardware configuration, determine that an overhead time associated with the switching when the application is in the first state is smaller than a difference between the second response time and the first response time when the application is in the second state. Additionally or alternatively, the program instructions, upon execution, may further configure the IHS to switch from the second hardware configuration to the first hardware configuration in response to a return from the second state to the first state.

In another illustrative, non-limiting embodiment, a method may implement one or more of the aforementioned operations. In yet another illustrative, non-limiting embodiment, a hardware memory storage device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIGS. 7A-B are sequence diagrams of an example of a method for improving response times based on application states according to some embodiments.

DETAILED DESCRIPTION

Systems and methods for improving response times based on application states are described. In various embodiments, techniques discussed herein may keep an IHS's power consumption at nominal levels most of the time, but may dynamically change the hardware configuration to allow faster response time, at least temporarily. The IHS may then return to normal operation to avoid a number of potential problems ranging from fast battery discharge to catastrophic thermal failure.

Power and performance throttled by application and hardware hints may be used to improve the application state response time at the right time within the proper context, instead of, for example, running all of the hardware at full performance level all the time. As such, these techniques may improve and/or optimize native application response time for selected application states having known trigger events or transitions points, so that users can perceive improved performance while using only the IHS's existing hardware resources.

In various embodiments, for a given IHS, the manner in which the system responds to a user command may be adjusted to adopt device profiles pertaining to orientation, peripherals, and/or form factor. For a given device profile, the manner in which the system responds to those commands may be optimized based on processes, threads, priorities, resources, and/or user behavior. In many cases, early detection hints in the I/O stack temporarily improve the performance of the IHS.

In various embodiments, techniques described herein may provide an optimization application implemented as: (a) middleware, (b) an Operating System (OS) with awareness of chipset hints, and/or (c) an OS with awareness of different application states for different applications.

Examples of hardware configuration and/or optimization procedures in option (a) include, but are not limited to: a CPU core affinity mask (to distribute threads among different cores), a most favorite core hardware hints to OS scheduler, application state/response characterization, storage/cache tiering, Intel® Dynamic Platform and Thermal Framework (DPTF) and core speed management, graphics offload, network application priority, and network smart byte (QoS for application priorities). Examples of hardware configuration and/or optimization procedures in option (b) include, but are not limited to: Microsoft Foundation Class (MFC) Library hints to OS scheduler, priority hints to OS scheduler, and DPTF and core speed management. Examples of hardware configuration and/or optimization procedures in option (c) include, but are not limited to: OS profiling application states and/or OS pre-trigger bottlenecked hardware.

Figure 1:
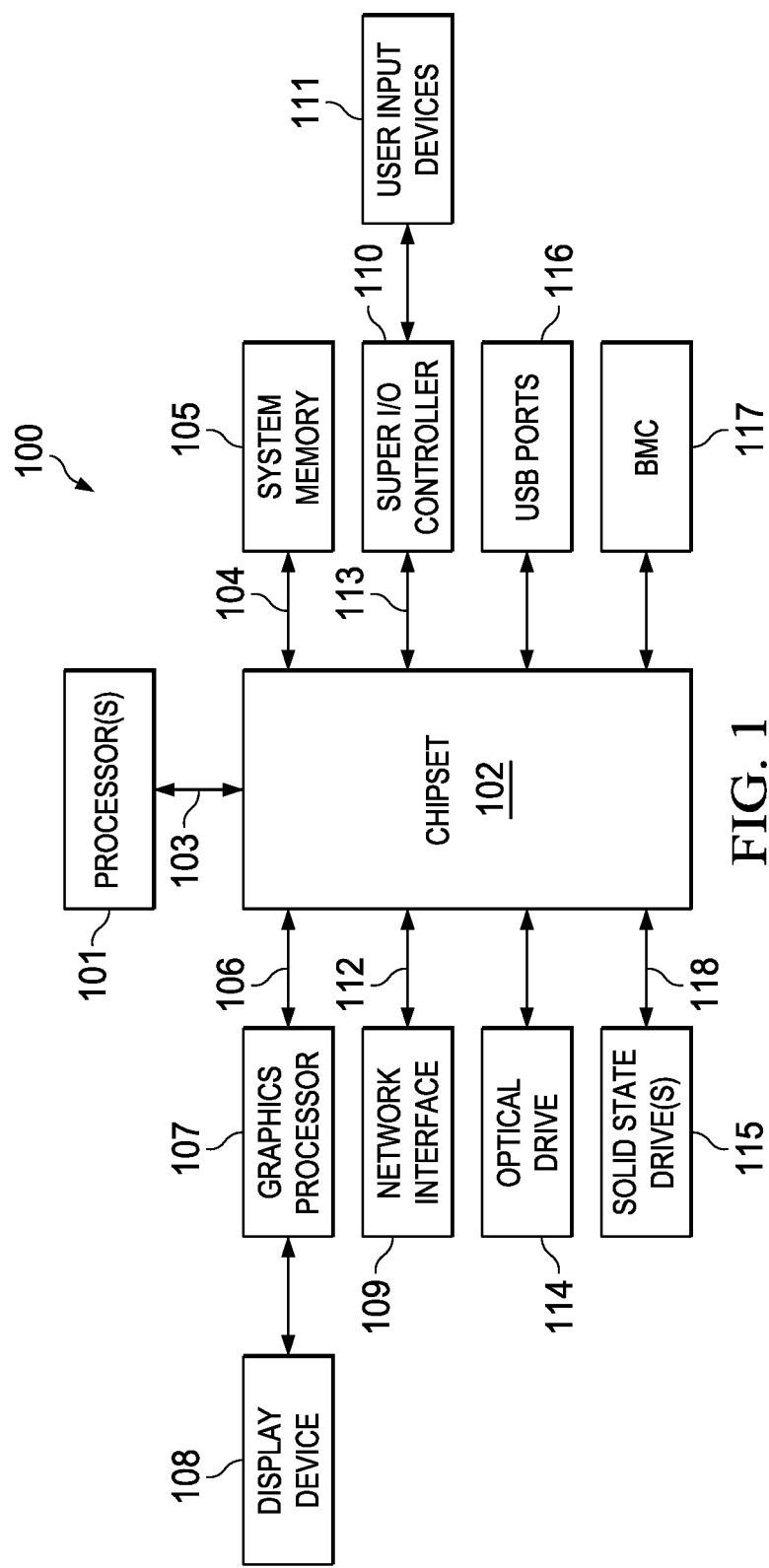
FIG. 1 is a diagram of an example of an Information Handling System (IHS) according to some embodiments.

To better illustrate the foregoing, FIG. 1 is a block diagram of IHS 100 configured according to certain embodiments. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes chipset 102 that may include one or more integrated circuits that are connect to processor(s) 101. In certain embodiments, chipset 102 may utilize a QPI (QuickPath Interconnect) bus 103 for communicating with processor(s) 101. Chipset 102 provides processor(s) 101 with access to a variety of resources. For instance, chipset 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), dynamic RAM (DRAM) or nonvolatile/Flash-type memory.

Chipset 102 may also provide access to a graphics processor 107. In certain embodiments, graphics processor 107 may be include within one or more video or graphics cards that have been installed as components of IHS 100. Graphics processor 107 may be coupled to chipset 102 via graphics bus 106, such as provided by an AGP (Accelerated Graphics Port) bus, or a PCIe (Peripheral Component Interconnect Express) bus. In certain embodiments, a graphics processor 107 generates display signals and provides them to display device 108.

In certain embodiments, chipset 102 may also provide access to one or more user input devices 111. In such embodiments, chipset 102 may be coupled to a super I/O controller 110 that provides interfaces for a variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. The I/O devices may interface super I/O controller 110 through wired or wireless connections. In certain embodiments, chipset 102 may be coupled to the super I/O controller 110 via Low Pin Count (LPC) bus 113.

Other resources may also be coupled to processor(s) 101 of the IHS 100 through chipset 102. In certain embodiments, chipset 102 may be coupled to network interface 109, such as provided by a Network Interface Controller (NIC) that is coupled to IHS 100. In certain embodiments, network interface 109 may be coupled to chipset 102 via PCIe bus 112. According to various embodiments, network interface 109 may communication via various wired and/or wireless networks. In certain embodiments, chipset 102 may also provide access to one or more Universal Serial Bus (USB) ports 116.

Chipset 102 also provides access to one or more solid state storage devices 115. Chipset 102 utilizes a PCIe bus interface connection 118 in order to communicate with solid state storage device 115. In certain embodiments, chipset 102 may also provide access to other types of storage devices. For instance, in addition to the solid state storage device 115, IHS 100 may also utilize one or more magnetic disk storage devices, or other types of the storage devices such as an optical drive or a removable-media drive. In various embodiments, solid state storage device 115 may be integral to IHS 100, or may be located remotely from IHS 100.

Another resource that may be accessed by processor(s) 101 via chipset 102 is a BIOS (Basic Input/Output System) 117. As described in more detail below with respect to additional embodiments, upon powering or restarting IHS 100, processor(s) 101 may utilize BIOS 117 instructions to initialize and test hardware components coupled to the IHS 100 and to load an operating system for use by the IHS 100.

BIOS 117 provides an abstraction layer that allows the operating system to interface with certain hardware components that are utilized by IHS 100. Via this hardware abstraction layer provided by BIOS 117, the software executed by the processor(s) 101 of IHS 100 is able to interface with certain I/O devices that are coupled to IHS 100. The Unified Extensible Firmware Interface (UEFI) was designed as a successor to BIOS. As a result, many modern IHSs utilize UEFI in addition to or instead of a BIOS. As such, BIOS is intended to also encompass UEFI.

In various embodiments, IHS 100 may not include each of the components shown in FIG. 1. Additionally or alternatively, IHS 100 may include various components in addition to those that are shown in FIG. 1. Furthermore, some components that are represented as separate components in FIG. 1 may, in some embodiments, be integrated with other components. For example, in various implementations, all or a portion of the functionality provided by the illustrated components may instead be provided by components integrated into the one or more processor(s) 101 as a system-on-a-chip (SOC) or the like.

As such, FIG. 1 shows various internal components of an example IHS 100 configured to implement systems and methods described herein. It should be appreciated, however, that other implementations may be utilized with any other type of IHSs (e.g., smart phones, smart watches, tablets, etc.).

Figure 2:
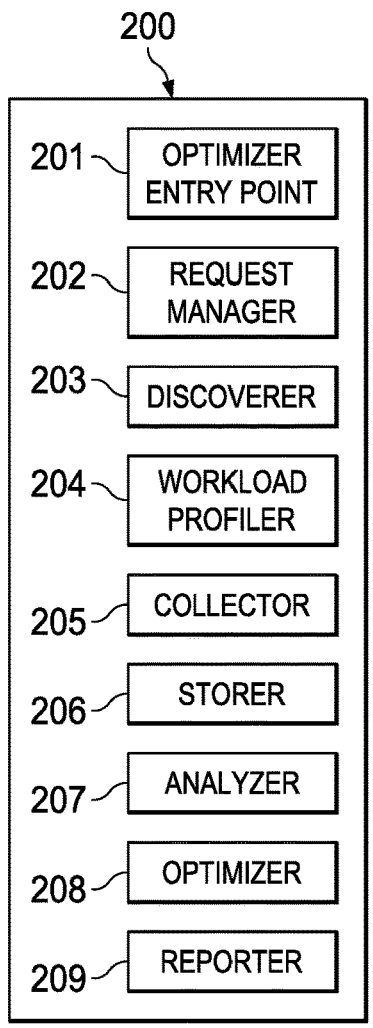
FIG. 2 is a diagram of an example of an optimization application according to some embodiments.

FIG. 2 is a diagram of an example of optimization application 200 according to some embodiments. A shown, optimization application 200 includes entry point 201, request manager 202, discoverer 203, workload profiler 204, collector 205, storer 206, analyzer 207, optimizer 208, and reporter 209.

In various implementations, one or more of components 201-209 may be built deployed in an OS as a kernel module, a user module, an Application Programming Interface (API), or the like. In other implementations, components 201-209 may be implemented as executable application(s) such as, for example, an OS-protected application or the like. Operation of components 201-209 is described in more detail in connection with FIG. 3-7.

Figure 3:
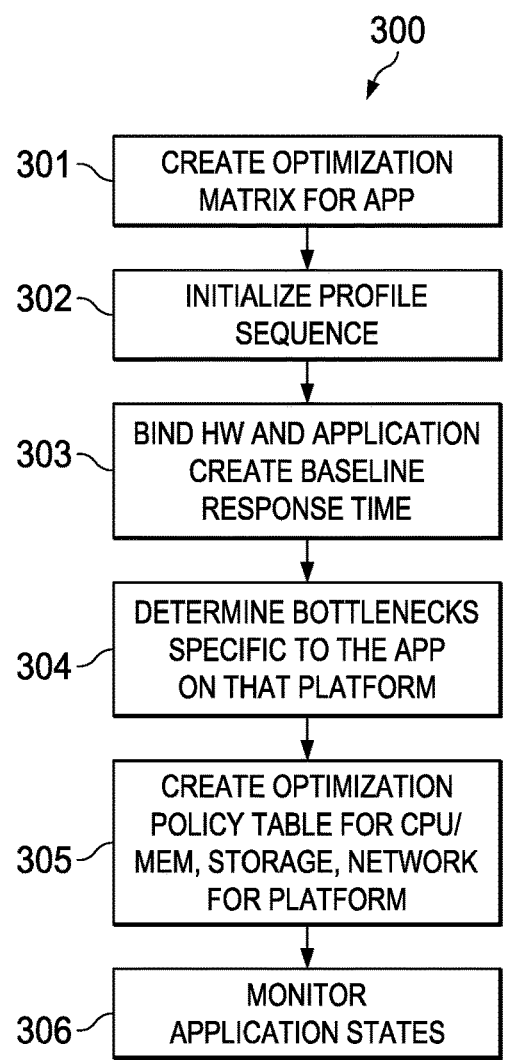
FIG. 3 is a flowchart an example of a method for improving response times based on application states according to some embodiments.

Particularly, FIG. 3 is a flowchart an example of method 300 for improving response times based on application states. In some embodiments, one or more of operations 301-306 may be performed by one or more of components 201-209 executed by IHS 100.

Figures 4, 5:
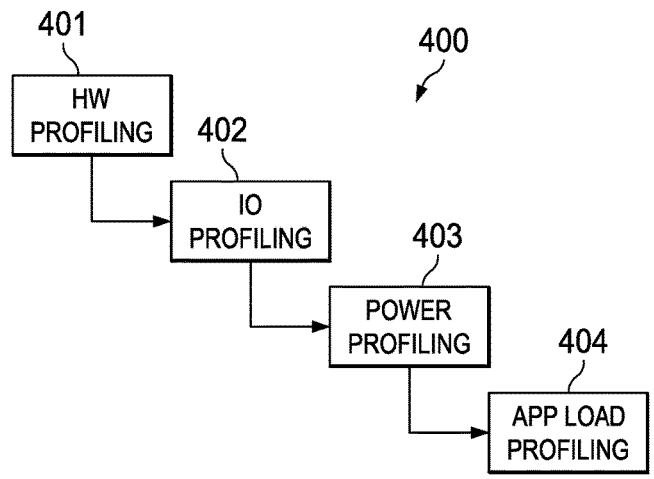
FIG. 4 is a flowchart of an example of a method for profiling application states and hardware configurations according to some embodiments.
FIG. 5 is an example of a profile table or matrix according to some embodiments.

At block 301, method 300 includes creating an optimization profile matrix or table for a given application executed by an IHS, for example, as shown in FIG. 5. Block 302 may initialize a profile sequence, such as shown in FIG. 4. Then, block 303 may bind certain hardware characteristics or features to that particular application, and it may identify one or more baseline response times for each stage of execution of the application.

At block 304, method 300 may determine bottlenecks specific to the application on that IHS and, at block 305, method 300 may create an optimization policy table for CPU, memory, storage, and/or network hardware components. At block 306, method 300 includes monitoring a plurality of states of the application.

In the initial stages of development, application states may be selected and characterized, for example, in a laboratory environment prior to the software release. In subsequent stages of development, automation may be added to recognize application states and to optimize response times based on usage.

In some cases, various Artificial Intelligence (AI) and adaptive learning techniques may be used for empirical application profiling in an automated fashion. Additionally or alternatively, as part of the monitoring, applications may be prioritized based upon foreground task or priority policy. As such, an optimization application may effectively manage the priority of various processes, thereby reducing system overhead.

For example, when two or more applications are executed concurrently, an optimization application may decide which of two conflicting (or at least partially conflicting) hardware configurations to adopt in order to reduce the response time of a higher priority application, potentially at the cost of increasing the response time of a lower priority application, at a given stage of execution of the higher priority application.

FIG. 4 is a flowchart an example of method 400 for profiling application states and hardware configurations. In some embodiments, method 400 may be performed during or in connection with execution of block 302 in FIG. 3. At block 401, method 400 includes creating or identifying a hardware profile for a given IHS. This may include, for example, discovery and classification of hardware parameters such as: CPU, memory/storage, graphics, and network components.

At block 402, method 400 may include creating or identifying an I/O profile for a given application being executed by the given IHS. For example, block 402 may identify typical file sizes and access patterns for the application. At block 403, method 400 may include creating or identifying a power consumption profile for the given application being executed by the given IHS. For example, block 403 may profile power and thermal states, as well as over and/or under-run conditions. Then, at block 404, method 400 may include creating or identifying an application load the given application stage. For example, block 404 may apply previously identified application states and determine the system bottlenecks.

FIG. 5 is an example of optimization profile table or matrix 500 created during or in connection with execution of block 301 in FIG. 3. As shown, column 501 includes a number of predefined states for a given application. In this particular example, each state has been conveniently labeled after a trigger event that precedes it—that is: initializing, launching, resizing, loading, closing, rotating, viewing, exiting, resuming, switching, saving, refreshing, and running are states trigger by user or application. Each trigger event may result, for example, from a user command, or it may be a result from a previous application state or process. It should be noted that, in many cases, an application state may be labeled independently of whatever trigger event cause the application to assume that state.

Columns 502 include one or more response times characterized, for example, using empirical tests to present known loads to the application and/or IHS. In some embodiments, three columns may show "poor," "acceptable," and "great" response times. For example, as a result of empirical tests or studies, it may be determined that a "poor" or "long"

response time is a time duration after which an average user finds the delay excessive and may cause a negative user experience. An "acceptable" or "nominal" response time may be a time duration that an average user expects to wait until a subsequent application state is reached or the requested operation is executed, such that the resulting delay does not negatively affect the user experience. And a "great" or "short" response time may be a time duration below which delays are not perceptible by the average user.

In other embodiments, element 502 of matrix 500 may include any number of columns. For example, two columns may show, for each trigger event 501: (i) a first response time expected to be achieved with a hardware configuration considered less than ideal for a particular IHS executing an application in a given application state (in terms of minimizing the response time, based on empirical tests), and (ii) a second response time expected to be achieved with a different hardware configuration considered to be ideal for that same IHS executing that same application during in the same application state.

Meanwhile, column 503 indicates a platform bottleneck and column 504 indicates an optimization method. In an example, the bottleneck may include a CPU bottleneck, and the optimization method may result in a hardware configuration that includes a number of CPU cores or speed that enables the IHS to respond to a user command received during the second state within the second response time. In another example, the bottleneck may include a memory or storage bottleneck, and the optimization method may result in a hardware configuration that includes a memory allocation or bandwidth that enables the IHS to respond to a user command received during the second state within the second response time. In yet another embodiment, the bottleneck may include a network or communication bottleneck, and the optimization method may result in a hardware configuration that includes a network priority or bandwidth that enables the IHS to respond to a user command received during the second state within the second response time.

In some cases, the bottleneck may be identified using empirical studies, and the optimization method may include learning algorithms to try to achieve a hardware configuration during runtime that optimizes the response time for the trigger event or application state.

Figure 6:
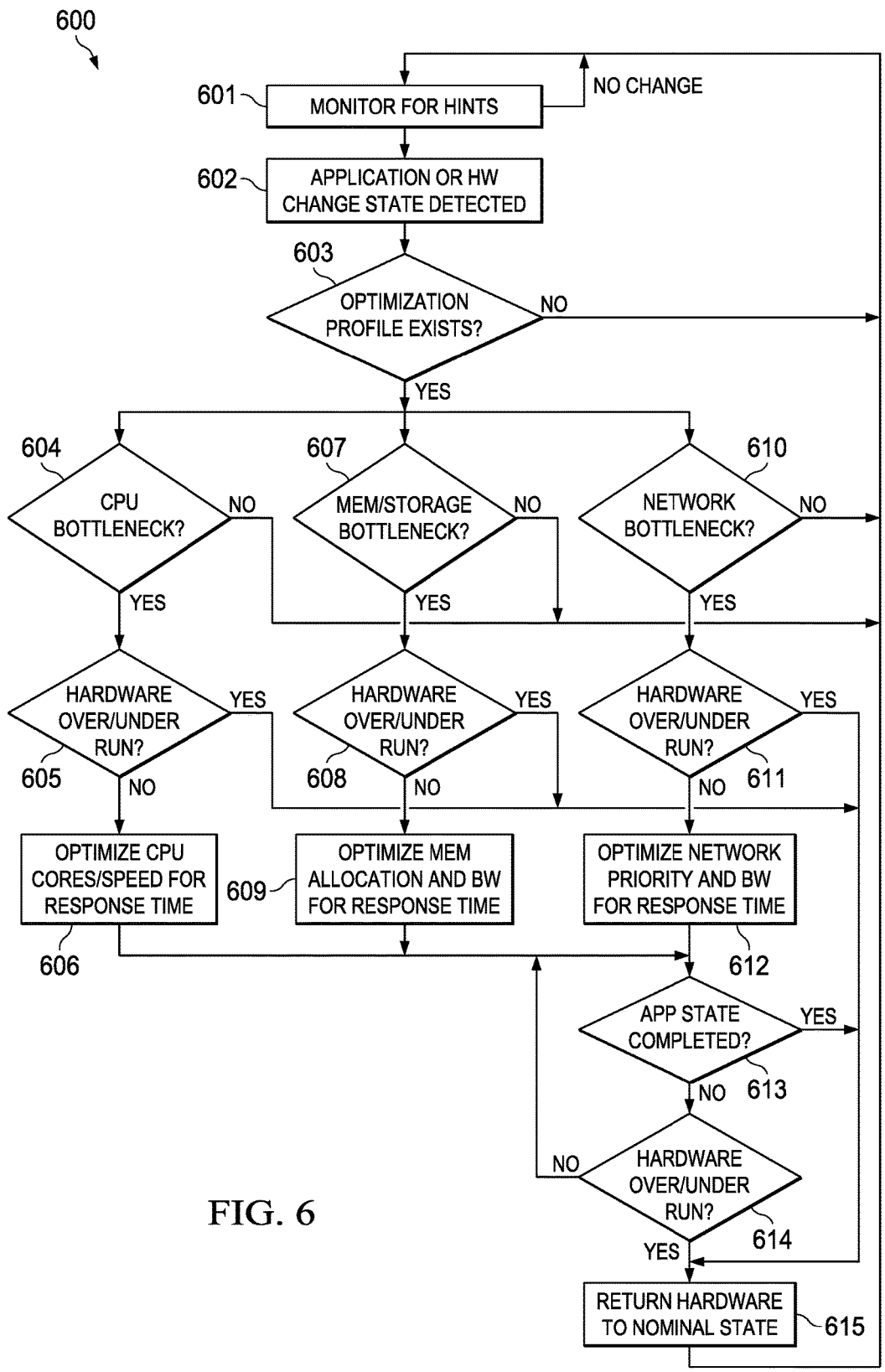
FIG. 6 is a flowchart an example of a method for employing the profile table or matrix during runtime according to some embodiments.

FIG. 6 is a flowchart an example of a method for employing an optimization profile table or matrix during runtime. In some embodiments, one or more of operations 601-615 may be performed by one or more of components 201-209 executed by IHS 100.

At block 601, application 600 monitors the IHS for trigger events or "hints," as shown in column 501 of FIG. 5. At block 602, the application or hardware changing of state is detected, and block 603 examines whether an optimization profile (e.g., matrix 500) has been created for that application and/or application state. If not, control returns to block 601.

If a profile exists, blocks 604, 607, and 610 determine whether a CPU bottleneck, a memory or storage bottleneck, or a network bottleneck exist or are expected to exist in that application state, respectively (e.g., using column 503 of profile 500). If not, control again returns to block 601. Otherwise, at blocks 605, 608, and 611, method 600 determines if the respective hardware configuration is over/under run. In some cases, over/under run scenarios may reflect hardware protection limits and thermal thresholds, such as CPU PL4 or other high-performance power state. If so, block 615 returns the hardware to its nominal configuration and control returns to block 601.

If not, blocks 606, 609, and 612 change the current hardware configuration using the corresponding technique shown in column 504, for example, to optimize the CPU cores/speed, memory allocating and bandwidth, and/or network priority and bandwidth for a desired response time (e.g., a selected one of response times 502 in profile 500).

At block 614, method 600 determines that the application state detected in block 602 is completed. For example, a series of operations included in the state may be fully executed, a user may issue an another command, etc. If the state is not completed, block 614 determines whether the hardware is over/under run. Conversely, if the state is completed and/or if the hardware is over/under run, control is passed to block 615.

In some cases, two or more applications may be executed concurrently by the same IHS. Each of the concurrent applications may have its own profile 500, and a first application may be in a first state and a second application may be in a second state.

However, a first hardware configuration required to reduce a first response time for the first application in the first state may be in conflict with a second hardware configuration required to reduce a second response time for the second application in the second state, at least in so far as finite resources must be allocated by the IHS between the two applications. In those cases, each application may have a priority indication relative to the others, such that, in the previous example, the second hardware configuration takes priority over the first hardware configuration while the second application is in the second state. Additionally or alternatively, each application state of each application may itself have a priority indication.

For example, the priority indication of each application state may indicate a priority of a hardware configuration for that state relative to other application states within the same application, in cases where the same application may be in two or more states at the same time (e.g., two or more threads executing in parallel or at least partially concurrently). For example, a "rotate" state may take priority over a "load" state even if the load state is initiated prior to the rotate state (e.g., rotating in a mobile device or other IHS with different physical screen configurations, such as: portrait and landscape orientation or folding, tablet or laptop mode, etc. would take priority over loading a file).

Additionally or alternatively, a priority indication of each application state may indicate a priority of a hardware configuration for that state relative to corresponding states across different applications (e.g., the "initialize" state of a second application may take priority over the "initialize" state of a first application). Such a priority indication may be added as a column in matrix 500, for instance.

In some embodiments, prior to switching from a first hardware configuration selected for a reduced response time during a first application state to a second hardware configuration selected for a reduced response time during a second application state, method 600 may determine that a time associated with the switching is smaller than a difference between a fast or great response time and a nominal or acceptable response time for the second application state.

Figure 7B:
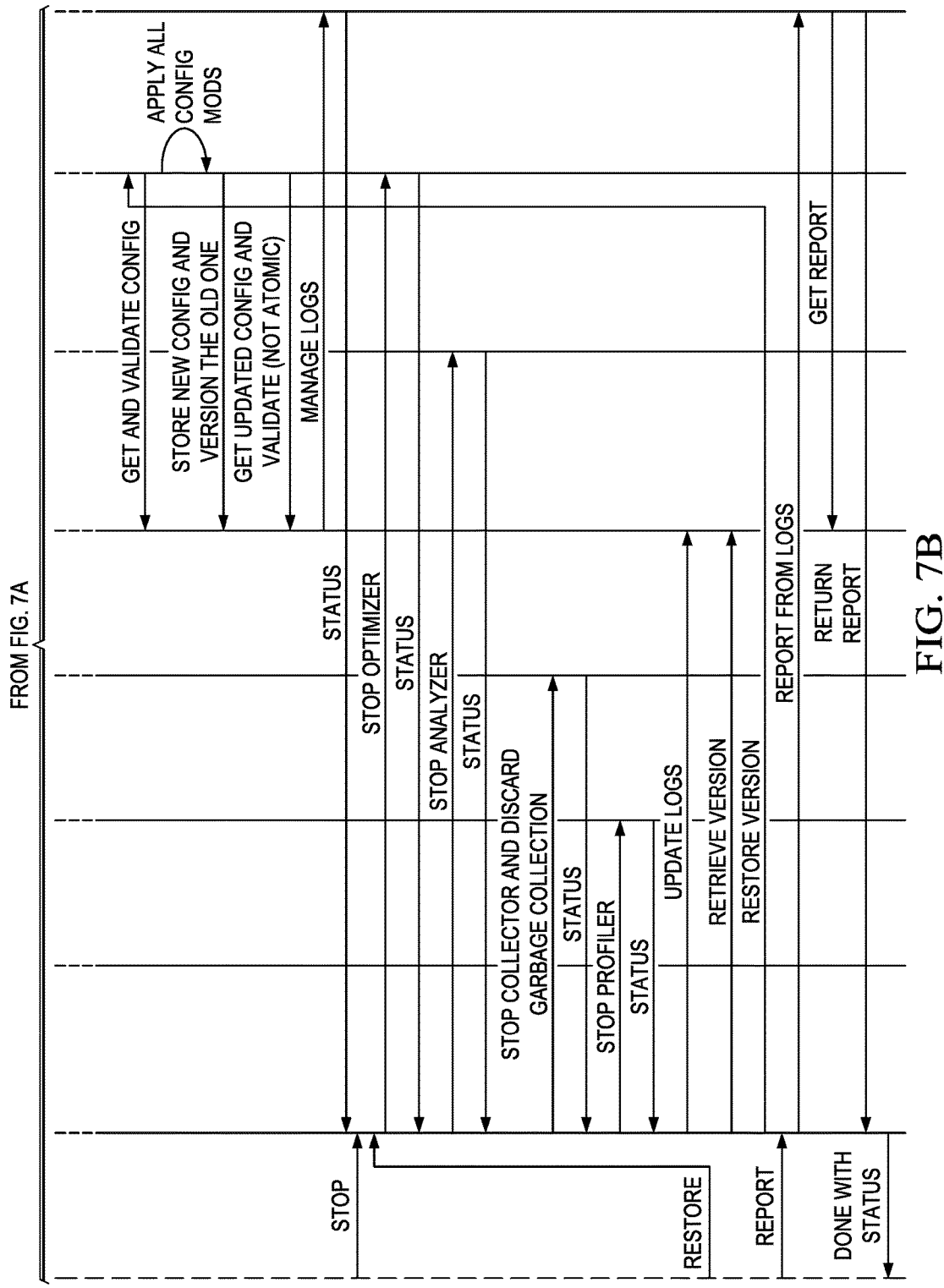

FIGS. 7A-B are a sequence diagrams of an example of method 700 for improving response times based on application states according to some embodiments. Initially, optimizer entry point 201 receives a user command, request or action, and causes request manager 202 to start all calls. Request manager 202 may authenticate the user and validate the syntax of the command, request or action.

Entry point 201 may then send an application profile (e.g., matrix 500) to request manager 202, which causes discoverer 203 to discover a hardware configuration. In turn, discoverer 203 causes the configuration information to be stored by storer 206. Then, request manager 202 starts a workflow by sending a command that invokes a dummy load, which is then presented to the IHS and the application.

Entry point 201 may then send an analyze command to request manager 202, which puts an application on a watch list based on a workflow command sent to workload profiler 204. In some cases, the workflow command is executed while the dummy load is running. Workload profiler causes collector 205 to collect performance data, collector 205 causes storer 206 to store results of the collection, and analyzer 207 analyzes the performance of the IHS and/or application. Logs are stored by reporter 209, which then provides runtime results to request manager 202.

Entry point 201 may then send an optimize command to request manager, which forwards the command to optimizer 208. Optimizer 208 may get and validate configuration information from storer 206, and it may apply a set of hardware configuration modification and/or settings, as described above. Optimizer may cause storer 206 to store new configuration information and a version information, and it may get updated configuration information and validate that information in a non-atomic fashion. Storer 206 may also manage logs with reporter 209, which sends a status update to request manager 202.

Entry point 201 may send a stop command to request manager 202, which stops optimizer 208 (which sends a status update back to request manager 202) and stops analyzer 207 (which sends another status update). Request manager 202 stops collector 205 and causes collector 205 to perform garbage collection and disposal (which sends yet another status update). Moreover, request manager stops profiler 204 (which sends still another status update), and causes storer 206 to update logs.

If a restore command is received by request manager 202, it may stop optimizer 208, analyzer 207, collector 205, and profiler 204; it may retrieve the hardware configuration version from storer 206, and it may then cause optimizer 208 to restore the corresponding hardware configuration prior to re-applying all hardware configuration modification and/or settings.

Entry point 201 may request a report from logs from reporter 209, which may get the report from storer 206 and return it to request manager 202. Finally, the request manager may inform entry point 201 that it is done with process 700.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a Central Processing Unit (CPU); and
   a hardware memory storage device coupled to the CPU, the hardware memory storage device having program instructions stored thereon that, upon execution by the CPU, cause the IHS to:
      identify a first state of an application being executed by the CPU at runtime;
      identify a trigger event configured to cause the IHS to change from the first state to a second state;
      in response to the trigger event, switch from the first state to a second state, wherein the first state is associated with first hardware configuration and the second state is associated with a second hardware configuration; and
      in response to the trigger event, switch the first hardware configuration to the second hardware configuration, wherein the trigger event belongs to a profile that stores, for the trigger event, an identification of a bottleneck and the second hardware configuration.

2. The IHS of claim 1, wherein at least one of the trigger events is selected from the group consisting of: initialize, launch, resize, load, close, rotate, view, exit, resume, switch, auto save, refresh, and run.

3. The IHS of claim 2, wherein the first and second states are selected from the group consisting of: initializing, launching, resizing, loading, closing, rotating, viewing, exiting, resuming, switching, saving, refreshing, and running.

4. The IHS of claim 1, wherein the bottleneck includes a CPU bottleneck, and wherein the second hardware configuration includes a number of CPU cores or speed that enables the IHS to respond to a user command received during the second state.

5. The IHS of claim 1, wherein the bottleneck includes a memory or storage bottleneck, and wherein the second hardware configuration includes a memory allocation or bandwidth that enables the IHS to respond to a user command received during the second state.

6. The IHS of claim 1, wherein the bottleneck includes a network or communication bottleneck, and wherein the second hardware configuration includes a network priority or bandwidth that enables the IHS to respond to a user command received during the second state.

7. The IHS of claim 1, wherein the profile further stores a second response time obtainable with the second hardware configuration, wherein a first response time stored in the profile in association with the first state is shorter that the second response time when the application is in the first state, and wherein the second response time is shorter than the first response time when the application is in the second state.

8. The IHS of claim 7, wherein the program instructions, upon execution, further configure the IHS to, prior to the switch from the first hardware configuration to the second hardware configuration, determine that an overhead time associated with the switching when the application is in the first state is smaller than a difference between the second response time and the first response time when the application is in the second state.

9. The IHS of claim 1, wherein the program instructions, upon execution, further configure the IHS to switch from the second hardware configuration to the first hardware configuration in response to a return from the second state to the first state.

10. A hardware memory storage device coupled to a processor of an Information Handling System (IHS), the hardware memory storage device having program instructions stored thereon that, upon execution by the processor, cause the IHS to:
- identify a first state of an application being executed by the CPU at runtime;
- identify a trigger event configured to cause the IHS to change from the first state to a second state;
- in response to the trigger event, switch from the first state to a second state, wherein the first state is associated with first hardware configuration and the second state is associated with a second hardware configuration; and
- in response to the trigger event, switch the first hardware configuration to the second hardware configuration, wherein the trigger event belongs to a profile that stores, for the trigger event, an identification of a bottleneck and the second hardware configuration.

11. The hardware memory storage device of claim 10, wherein the bottleneck includes a CPU bottleneck, and wherein the second hardware configuration includes a number of CPU cores or speed that enables the IHS to respond to a user command received during the second state.

12. The hardware memory storage device of claim 10, wherein the bottleneck includes a memory or storage bottleneck, and wherein the second hardware configuration includes a memory allocation or bandwidth that enables the IHS to respond to a user command received during the second state.

13. The hardware memory storage device of claim 10, wherein the bottleneck includes a network or communication bottleneck, and wherein the second hardware configuration includes a network priority or bandwidth that enables the IHS to respond to a user command received during the second state.

14. The hardware memory storage device of claim 10, wherein the profile further stores a second response time obtainable with the second hardware configuration, wherein the second response time is shorter, during the second state, than a first response time obtainable during the first state, and wherein the program instructions, upon execution, further configure the IHS to, prior to the switch, determine that an overhead time associated with the switch is smaller than a difference between the second response time and the first response time.

15. A method comprising:
- identifying a first state of an application being executed by the CPU at runtime;
- identifying a trigger event configured to cause the IHS to change from the first state to a second state;
- in response to the trigger event, switching from the first state to a second state, wherein the first state is associated with first hardware configuration and the second state is associated with a second hardware configuration; and
- in response to the trigger event, switching the first hardware configuration to the second hardware configuration, wherein the trigger event belongs to a profile that stores, for the trigger event, an identification of a bottleneck and the second hardware configuration.

16. The method of claim 15, wherein: (a) the bottleneck includes a CPU bottleneck and the second hardware configuration includes a number of CPU cores or speed; (b) the bottleneck includes a memory or storage bottleneck, and the second hardware configuration includes a memory allocation or bandwidth; or (c) the bottleneck includes a network or communication bottleneck, and the second hardware configuration includes a network priority or bandwidth.

17. The method of claim 15, wherein the profile further stores a second response time obtainable with the second hardware configuration, wherein the second response time is shorter, during the second state, than a first response time obtainable during the first state, and wherein the method further comprises, prior to the switch, determining that an overhead time associated with the switch is smaller than a difference between the second response time and the first response time.

* * * * *